United States Patent
Kordsmeyer (10) Patent No.: US 6,332,080 B1
(45) Date of Patent: Dec. 18, 2001

(54) PROCESS FOR CONTROLLING THE ESTABLISHMENT AND OPERATION OF PATHS OF TRANSMISSION (BEARERS) IN A WIRELESS TELECOMMUNICATION SYSTEM, IN PARTICULAR IN A DECT-SPECIFIC RLL/WLL SYSTEM BOUND INTO AN ISDN-SYSTEM AS A LOCAL INFORMATION TRANSMISSION LOOP

(75) Inventor: Martin Kordsmeyer, Hörstel (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/202,165

(22) PCT Filed: Jun. 6, 1997

(86) PCT No.: PCT/DE97/01144

§ 371 Date: Dec. 9, 1998

§ 102(e) Date: Dec. 9, 1998

(87) PCT Pub. No.: WO97/50273

PCT Pub. Date: Dec. 31, 1997

(30) Foreign Application Priority Data

Jun. 24, 1996 (DE) .............................................. 196 25 161

(51) Int. Cl.[7] ..................................................... H04Q 7/20

(52) U.S. Cl. ......................... 455/450; 455/426; 455/453; 455/446; 370/319; 370/320; 370/321

(58) Field of Search ................................. 455/54.1, 446, 455/403, 450, 105, 426, 509, 517, 451, 453; 370/319, 320, 321, 342, 324

(56) References Cited

U.S. PATENT DOCUMENTS 5,181,199 1/1993 Motoki et al. .
5,212,684 * 5/1993 MacNamee et al. .................. 370/24
5,530,917 * 6/1996 Andersson et al. .................. 455/54.1

FOREIGN PATENT DOCUMENTS

| 196 25 141 | | |
|---|---|---|
| A1 | 10/1997 | (DE) . |
| 0 415 502 A2 | 3/1991 | (EP) . |
| WO 96/19065 * | 6/1996 | (FI) ............................... H04L/29/08 |
| WO 94/19877 * | 9/1994 | (SE) ............................... H04B/7/204 |
| WO 96/15642 * | 5/1996 | (SE) ............................... H04Q/7/36 |
| WO 93/21719 | 10/1993 | (WO) . |

OTHER PUBLICATIONS

IEEE Communications Magazine, Jan. 1995, David D. Falconer et al, Time Division Multiple Access Methods for Wireless Personal Communications, pp. 50–57.

DECT/GAP standard (Digital European Cordless Telecommunication; cf. (1): Nachrichtentechnik Elektronik 42 (1992) Jan./Feb. No. 1, Berlin, DE; U. Pilger "Struktur des DECT–Standards," pp. 23–29.

Telcom Report 16 (1993), No. 1, J. H. Koch: "Digitaler Komfort für schnurlose Telekommunikation—DECT–Standard eröffnet neue Nutzungsgebiete", pp. 26–27.

(List continued on next page.)

*Primary Examiner*—Nay Maung
(74) *Attorney, Agent, or Firm*—Schiff Hardin & Waite (57) ABSTRACT

In wire-free telecommunications systems, in particular in a DECT-specific RLL/WLL system which is included as a local message transmission loop in an ISDM system, in order to optimize the setting up and use of transmission paths with respect to the number of transmission paths for wire-free message transmission, transmission path numbers are assigned to the transmission paths such that collisions are avoided during the setting up and use of the transmission paths (links). In this way, the resources of the radio interface are used efficiently. In addition, the complexity of the telecommunications systems and the susceptibility to faults when setting up links (setting up the transmission paths) are minimized.

15 Claims, 8 Drawing Sheets

OTHER PUBLICATIONS tec 2/93—Das technische Magazin von Ascom "Wege zur universellen mobilen Telekommunikation", pp. 35–42.

Informatik Spektrum Jun. 14, 1991, No. 3, Berlin A. Mann, "Der GSM–Standard—Grundlage für dugutake europäische Mobilfunknetze", pp. 137–152.

Nachrichtentech, Elektron, Berlin, vol. 45 (1995), Roland Geissler, Drahtlose ISDN–Kommunikation, pp. 21–23.

Nachrichtentech, Elektron, Berlin, vol. 45, (1995), Radio in the Local Loop, pp. 29–30.

Nachrichtentech, Elektron, Berlin, vol. 41, (1991) Werner Baerwald, "Schnittstellen in der Telekommunikation Teil 1: Standardisierung in der Telekommunikation—ein Überlick", pp. 99–102; Teil 2: pp. 138–143; Teil 3: pp. 179–182; Teil 3 (Schluss): pp. 219–222: Teil 4: pp. 19–20; Teil 5: pp. 59–61: Teil 5 (Schluss): pp. 99–102; Teil 6: pp. 150–153; Teil 7: pp. 238–241; Teil 8: pp. 29–33; Teil 9: pp. 95–97; Teil 9: pp. 129–135; & Teil 10: pp. 187–190.

Philips Telecommunication Review, R. J. Mulder, "DECT, a universal cordless access system", pp. 68–73.

Unterrichtsblatter Jg. 48, Feb. 1995, Rolf Kohlmeier, Protokolle am Beispiel des OSI–Referenzmodells, pp. 102–111.

Communications Research Group, University of Wales, Wab Hing IP et al, "Cordless Access to the ISDN basic rate service", pp. 29/1–29/7.

* cited by examiner

PROCESS FOR CONTROLLING THE ESTABLISHMENT AND OPERATION OF PATHS OF TRANSMISSION (BEARERS) IN A WIRELESS TELECOMMUNICATION SYSTEM, IN PARTICULAR IN A DECT-SPECIFIC RLL/WLL SYSTEM BOUND INTO AN ISDN-SYSTEM AS A LOCAL INFORMATION TRANSMISSION LOOP

BACKGROUND OF THE INVENTION

In telecommunications systems having a message transmission route between a message source and a message sink, transmitting and receiving devices are used for message processing and transmission, in which 1) the message processing and message transmission can be carried out in a preferred transmission direction (simplex operation) or in both transmission directions (duplex operation),
2) the message processing is analogue or digital,
3) the message transmission is wire-based over the trunk transmission, or is carried out wire-free on the basis of various message transmission methods FDMA (Frequency Division Multiple Access), (Time Division Multiple Access) and/or CDMA (Code Division Multiple Access)—for example in accordance with radio standards such as DECT, GSM, WACS or PACS, IS-54, PHS, PDC etc. (cf. IEEE Communications Magazine, January 1995, pages 50 to 57; D. D. Falconer et al: "Time Division Multiple Access Methods for Wireless Personal Communications").

"Message" is a generic term which covers both the useful content (information) and the physical representation (signal). Despite a message having the same useful content—that is to say the same information—different signal forms may occur. Thus, for example, a message relating to a circuit may be transmitted (1) in the form of an image,
(2) as the spoken word,
(3) as the written word,
(4) as an encrypted word or image.

The type of transmission in accordance with (1) ... (3) is in this case normally characterized by continuous (analogue) signals while, in the case of the transmission type according to (4), the signals are normally discontinuous (for example pulses, digital signals).

On the basis of this general definition of a message system, the invention relates to a method for controlling the setting up of transmission paths (bearers) in wire-free telecommunications systems, in particular in a DECT-specific RLL/WLL system (Radio Local Loop/Wireless Local Loop) which is included as a local message transmission loop in an ISDN system.

Figure 1:
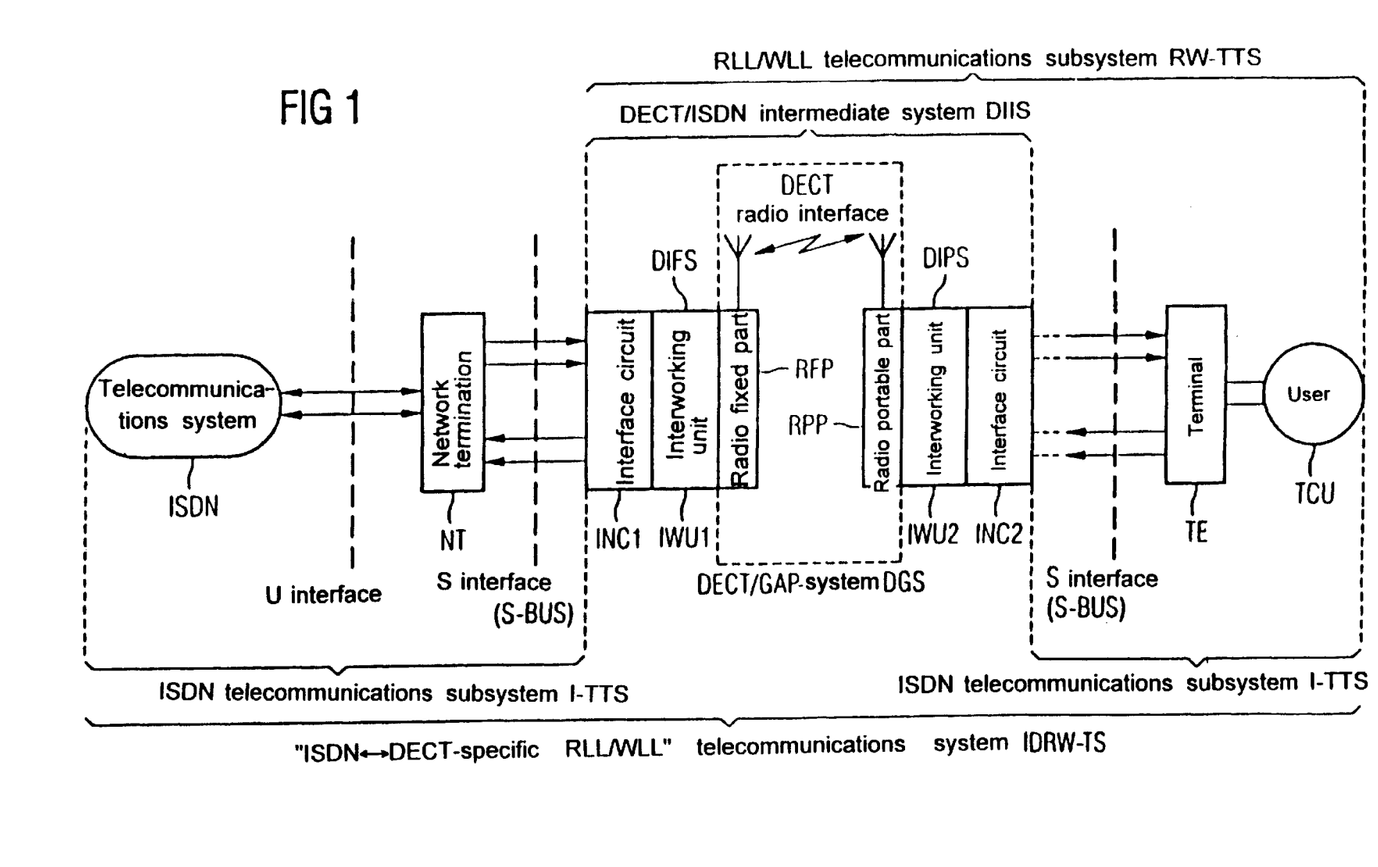
FIG. 1 depicts a RLL/WLL telecommunications subsystem.

Using as references the documents "*Nachrichtentechnik Elektronik* (*Telecommunications electronics*), Berlin 45 (1995) Issue 1, pages 21 to 23 and Issue 3 pages 29 and 30" as well as *IEE Colloguium* 1993, 173; (1993), pages 29/1–29/7; W. Hing, F. Halsall: "Cordless access to the ISDN basic rate service", and on the basis of a DECT/ISDN Intermediate System DIIS according to *ETSI Publication prETS* 300xxx, Version 1.10, September 1996, FIG. 1 shows an "ISDN⇔DECT-specific RLL/WLL" Telecommunications system IDRW-TS with an ISDN telecommunications subsystem I-TTS (cf. document "*Nachrichtentechnik Elektronik* (*Telecommunications electronics* ), Berlin 41–43, Parts: 1 to 10, Part 1: (1991) Issue 3, pages 99 to 102; Part 2: (1991) Issue 4, pages 138 to 143; Part 3: (1991) Issue 5, pages 179 to 182 and Issue 6, pages 219 to 220; Part 4 (1991) Issue 6, pages 220 to 222 and (1992) Issue 1, pages 19 to 20; Part 5: (1992) Issue 2, pages 59 to 62 and (1992) Issue 3, pages 99 to 102; Part 6: (1992) Issue 4, pages 150 to 153; Part 7: (1992) Issue 6, pages 238 to 241; Part 8: (1993) Issue 1, pages 29 to 33; Part 9: (1993) Issue 2, pages 95 to 97 and (1993) Issue 3, pages 129 to 135; Part 10: (1993) Issue 4, pages 187 to 190;") and a DECT-specific RLL/WLL telecommunications subsystem RW-TTS.

The DECT/ISDN Intermediate System DIIS and the RLL/WLL telecommunications subsystem RW-TTS are in this case preferably based on a DECT/GAP-System DGS (Digital Enhanced (previously: European) Cordless Telecommunication; cf. (1): Nachrichtentechnik Elektronik 42 (1992) January/February No. 1, Berlin, DE; U. Pilger "Struktur des DECT-Standards" (Structure of the DECT standard), pages 23 to 29 in conjunction with the ETSI publication ETS 300175-1 ... 9, October 1992; (2): Telecom Report 16 (1993), No. 1, J. H. Koch: "Digitaler Komfort für schnurlose Telekommunikation—DECT-Standard eröffnet neue Nutzungsgebiete" (Digital convenience for wire-free telecommunication—DECT standard opens up new fields of application), pages 26 and 27; (3): tec 2/93—Das technische Magazin von Ascom "Wege zur universellen mobilen Telekommunikation" (The technical magazine from Ascom "Means for universal mobile telecommunication"), pages 35 to 42; (4) Philips Telecommunication Review Vol. 49, No. 3, September 1991, R. J. Mulder: "DECT, a universal cordless access system"; (5): WO 93/21719 (FIGS. 1 to 3 with associated description)). The GAP standard (Generic Access Profile) is a subset of the DECT standard which has the task of ensuring interoperability of the DECT radio interface for telephone applications (cf. *ETSI publication prETS* 300444, April 1995).

The DECT/ISDN Intermediate System DIIS and the RLL/WLL telecommunications subsystem RW-TTS can alternatively be based on a GSM system (Groupe Spéciale Mobile or Global System for Mobile Communication; cf. Informatik Spektrum 14 (1991) June, No. 3, Berlin, DE; A. Mann: "Der GSM-Standard—Grundlage für digitale europäische Mobilfunknetze (The GSM standard—Basis for digital European mobile radio networks)", pages 137 to 152). Instead of this, it is also possible in the context of a hybrid telecommunications system for the ISDN telecommunications subsystem I-TTS to be designed as a GSM system.

Furthermore, other possible ways for producing the DECT/ISDN intermediate system DIIS, the RLL/WLL telecommunications subsystem RW-TTS or the ISDN telecommunications subsystems I-TTS include the systems mentioned initially as well as future systems which are based on the known multiple access methods FDMA, TDMA, CDMA (Frequency Division Multiple Access, Time Division Multiple Access, Code Division Multiple Access) and hybrid multiple access methods formed from them.

The use of radio channels (for example DECT channels) in classical cable-based telecommunications systems, such as ISDN, is becoming increasingly important, particularly against the background of future alternative network operators without their own complete cable network.

Thus, for example in the case of the RLL/WLL telecommunications subsystem RW-TTS, the wire-free connection technology RLL/WLL (Radio in the Local Loop/Wireless in the Local Loop) for example including the DECT system DS, ISDN services can be made available to the ISDN subscriber on standard ISDN interfaces (cf. FIG. 1).

In the "ISDN⇔DECT specific RLL/WLL" telecommunications system IDRW-TS according to FIG. 1, a telecommunications subscriber (user) TCU (Tele-Communication User) with TE (Terminal Endpoint; Terminal Equipment), is included in the ISDN world, with the services available in it, for example via a standardized S interface (S-BUS), the DECT/ISDN Intermediate System DIIS, which is designed as a local message transmission loop—is preferably DECT-specific and is contained in the RLL/WLL telecommunications subsystem RW-TTS—(first telecommunications subsystem), a further standardized S interface (S-BUS), a Network Termination NT and a standardized U interface of the ISDN telecommunications subsystem I-TTS (second telecommunications subsystem).

The first telecommunications subsystem DIIS essentially comprises two telecommunications interfaces, a first telecommunications interface DIFS (DECT Intermediate Fixed System) and a second telecommunications interface DIPS (DECT Intermediate Portable System), which are connected to one another without wires, for example via a DECT radio interface. Because of the quasiposition-based first telecommunications interface DIFS, the first telecommunications subsystem DIFS forms the local message transmission loop defined above in this context. The first telecommunications interface DIFS contains a Radio Fixed Part RFP, an Inter-Working Unit IWU1 and an INterface Circuit INC1 for the S interface. The second telecommunications interface DIPS contains a Radio Portable Part RPP, an InterWorking Unit IWU2 and an INterface Circuit INC2 for the S interface. The radio fixed part RFP and the radio portable part RPP in this case form the known DECT/GAP system DGS.

Figure 2:
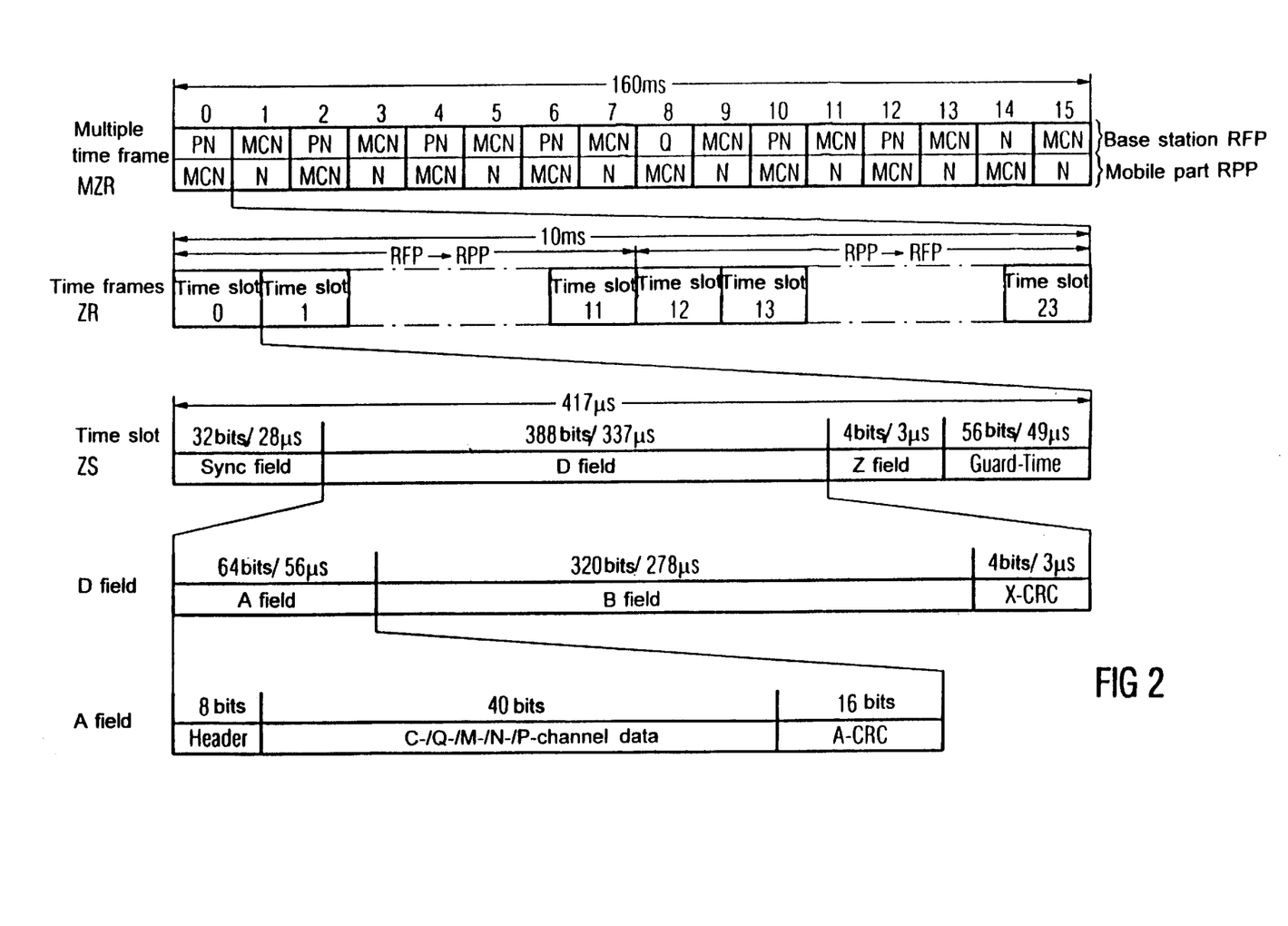
FIG. 2 depicts a TDMA structure of the DECT/GAP system.

The following general problems arise for a DECT-specific RLL system as a carrier for, as far as possible, all ISDN services in the subscriber connection:
a) simulation of the ISDN channel structure (D channel and 2 B channels), the D channel in particular in the following text,
b) good bandwidth economy; particularly important for ISDN since some services already require two DECT channels for the B channel data rate of 64 kbps,
c) minimum technical complexity.
Simulation of the D Channel
Characteristics of the D Channel
Common signalling channel on the C plane for all Terminal Endpoints TE connected to the ISDN connection.
The TE-specific signalling channels to the network are separated therein by TE-specific addresses TEI (Terminal Endpoint Identifier). The access mechanism to the D channel ensures the sequence of the messages on a TE-specific basis.
Throughput rate: 16 kbps
Utilization: dependent on a large number of criteria, as a rule lower than the maximum capacity; jam situations possible, although these can be cleared quickly because of the high capacity.
Dect Channels
Based on the document "Nachrichtentechnik Elektronik" (Telecommunications electronics) 42 (1992) January/February, No. 1, Berlin, DE; U. Pilger; "Struktur des DECT-Standards (Structure of the DECT standard)", pages 23 to 29, in conjunction with ETS 300 175-1 . . . 9, October 1992", FIG. 2 shows the TDMA structure of the DECT/GAP system DGS. The DECT/GAP system is a hybrid system with respect to the multiple access methods, in which radio messages can be transmitted, using the FDMA principle, on ten frequencies in the frequency band between 1.88 and 1.90 GHz and, using the TDMA principle according to FIG. 2, can be transmitted in a predetermined time sequence from the base station RFP to the portable part RPP and from the portable part RPP to the base station RFP (duplex operation). The time sequence is in this case governed by a multiple time frame MZR, which occurs every 160 ms and has 16 time frames ZR, each having a time duration of 10 ms. Information items are transmitted separately in these time frames ZR to the base station RFP and the portable part RPP, these information items relating to a C-, M-, N-, P-, Q-channel defined in the DECT standard. If information items for a number of these channels are transmitted in one time frame ZR, then the transmission is carried out on the basis of a priority list where M>C>N and P>N. Each of the 16 time frames ZR in the multiple time frame MZR is in turn split into 24 time slots ZS each having a time duration of 417 μs, of which 12 time slots ZS (time slots 0 . . . 11) are intended for the transmission direction "base station RFP→portable part RPP", and a further 12 time slots ZS (time slots 12 . . . 23) for the transmission direction "portable part RPP→base station RFP". In accordance with the DECT standard, information items with a bit length of 480 bits are transmitted in each of these time slots. Of these 480 bits, 32 bits are transmitted as synchronization information in a sync field, and 388 bits as useful information in a D field. The remaining 60 bits are transmitted as additional information in a Z field and as protection information in a "guard time" field. The 388 bits in the D field which are transmitted as useful information are in turn split into a 64-bit long A field, a 320-bit long B field and a 4-bit long "X-CRC" word. The 64-bit A field is composed of an 8-bit long data header, a 40-bit long data set with data for the C-, Q-, M-, N-, P-channels and a 16-bit long "A-CRC" word.

Figure 3:
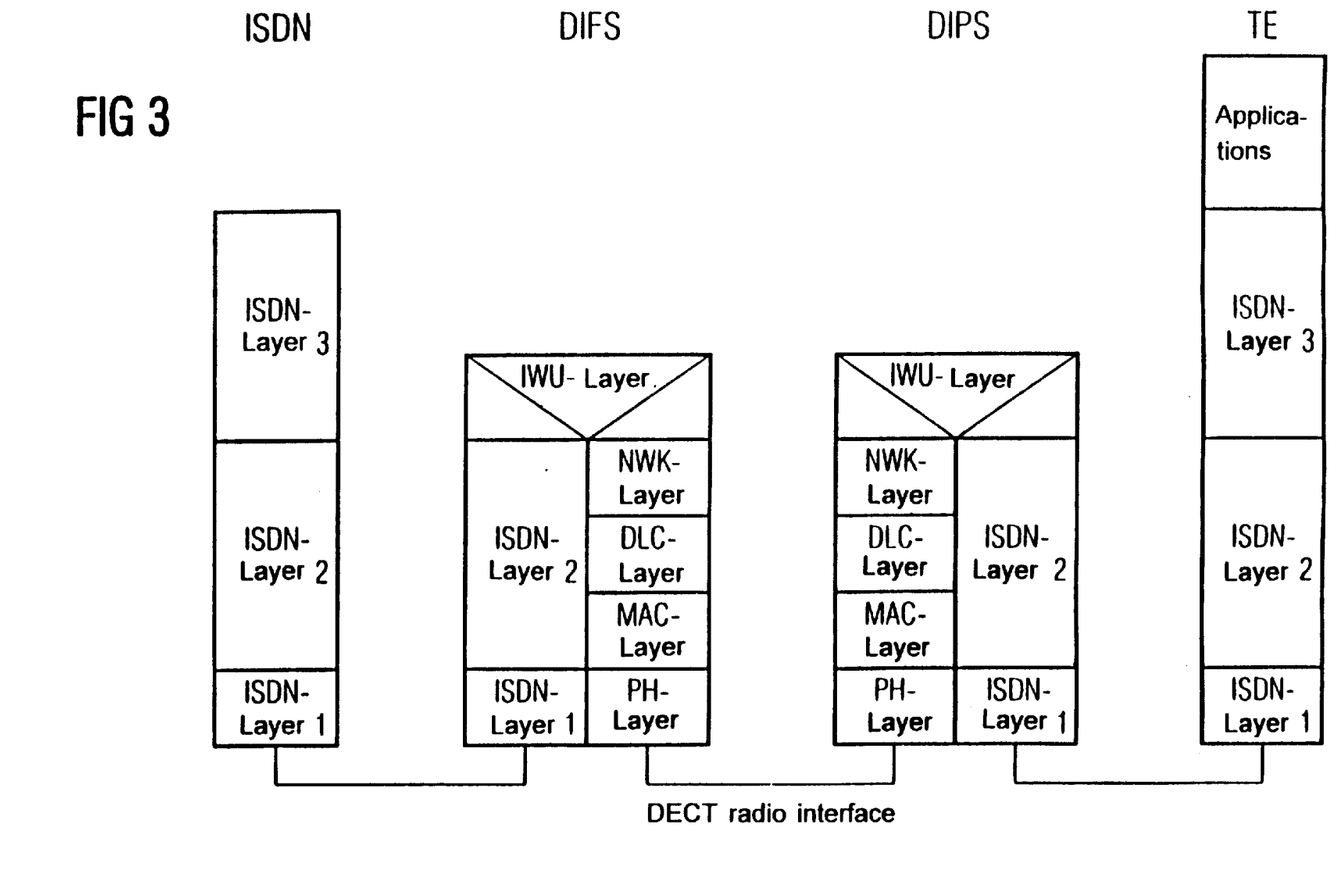
FIG. 3 depicts a model of the C plane.
Figure 4:
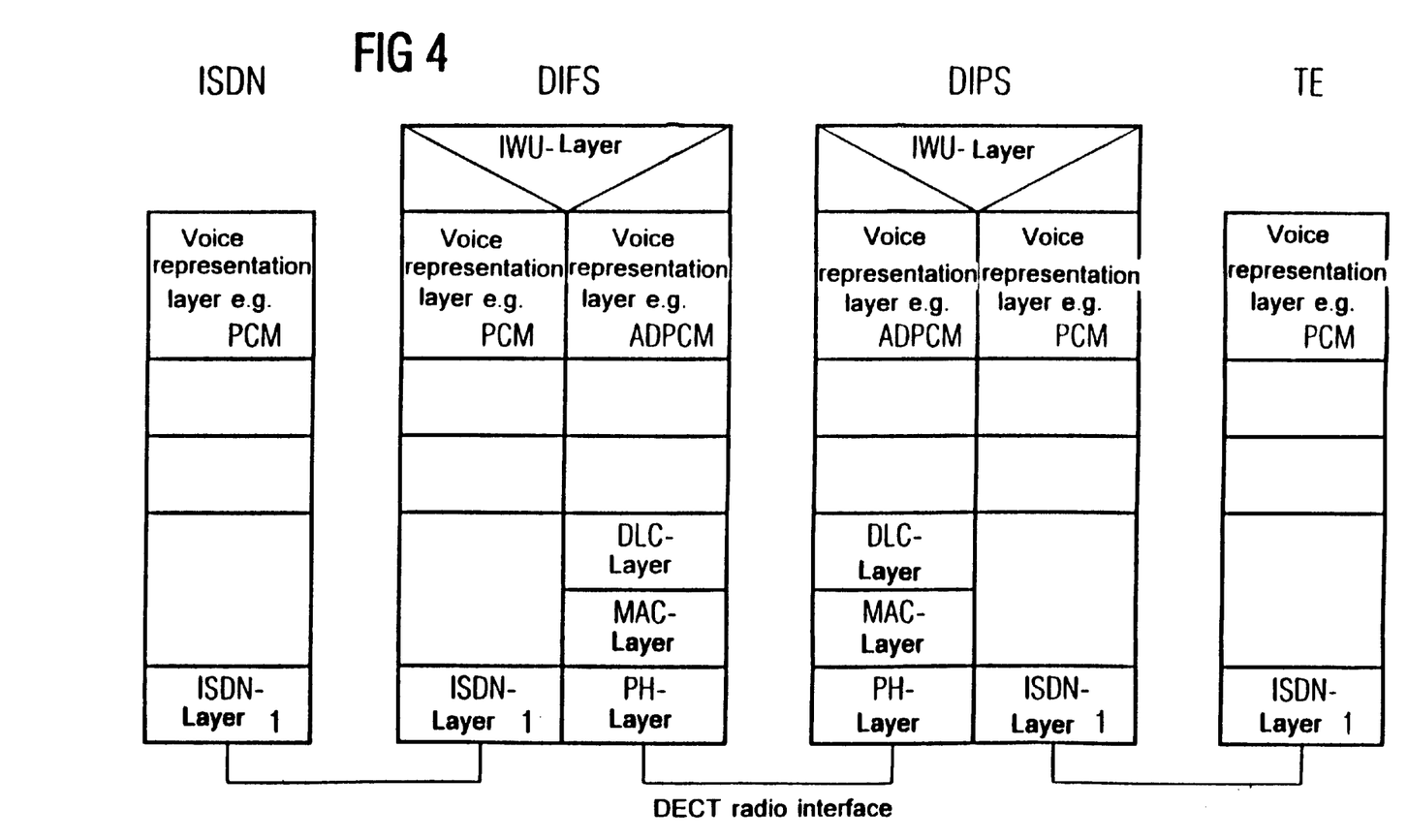
FIG. 4 depicts a model of the U plane for voice data transmission.

Characteristics
Use of TDMA time slots.
In principle one $C_s$ channel (s=slow) is used per time slot for signalling (C plane in the DECT standard), and one associated channel (U plane in the DECT standard) for the user or useful information (throughput: 32 kbps).
Throughput of the $C_s$ channel: 2 kbps.
The DECT standard also offers other channel structures, for example a $C_f$ channel (f=fast).
The $C_f$ channel occupies one time slot.
Throughput of the $C_f$ channel: 25.6 kbps.
On the basis of the OSI/ISO layer model (cf. (1): Information sheets—Deutsche Telekom Year 48, February 1995, pages 102 to 111; (2): ETSI publication ETS 300175-1 . . . 9, October 1992; (3): ETSI publication ETS 300102, February 1992; (4): ETSI publication ETS 300125, September 1991; (5): ETSI publication ETS 300012, April 1992), FIG. 3 shows a model of the C plane in the "ISDN⇆DECT specific RLL/WLL" telecommunications system IDRW-TS according to FIG. 1.
On the basis of the OSI/ISO layer model (cf. (1): Information sheets—Deutsche Telekom Year 48, February 1995, pages 102 to 111; (2): ETSI publication ETS 300175-1 . . . 9, October 1992; (3): ETSI publication ETS 300102, February 1992; (4): ETSI publication ETS 300125, September 1991; (5): ETSI publication ETS 300012, April 1992), FIG. 4 shows a model of the U plane for voice data transmission in the "ISDN⇆DECT specific RLL/WLL" telecommunications system IDRW-TS according to FIG. 1.
Bandwidth Economy
The $C_s$ channel structure offers optimum bandwidth economy for a standard voice link, since only one transmission path (bearer)—for example MBC to the LCNy, LCN1 according to FIG. 5—one link or one time slot is required according to FIG. 5 and on the basis of FIGS. 3 and 4, and taking account of the ETSI publications (ETS 300175-1, October 1992, Chapter 7; ETS 300175-3, October 1992, Chapter 4.1; ETS 300175-4, October 1992, Chapter 4).

Figure 5:
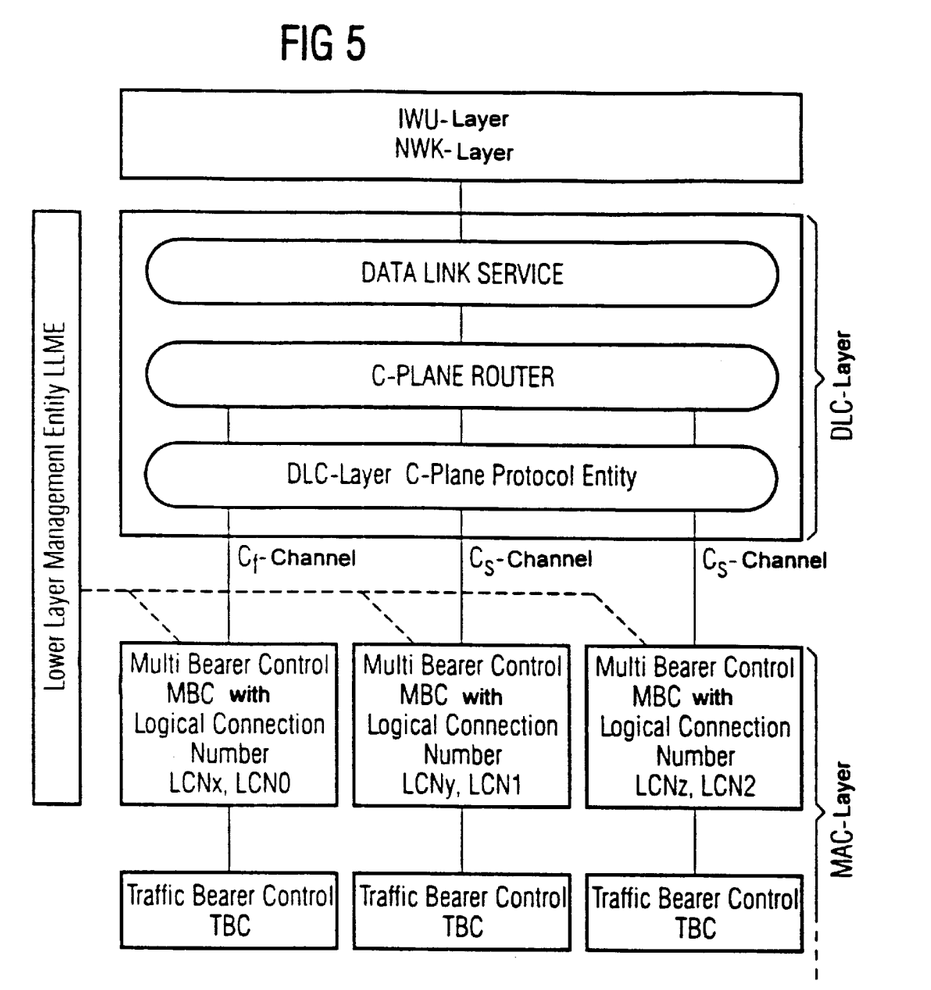
FIG. 5 depicts the $C_s$ channel structure.

According to FIG. 5 and on the basis of FIGS. 3 and 4 and taking account of the ETSI publications (ETS 300175-1, October 1992, Chapter 7; ETS 300175-3, October 1992, Chapter 4.1; ETS 300175-4, October 1992 Chapter 4), the use of the $C_f$ channel leads to reduced bandwidth economy, since the U plane itself requires a further transmission path (bearer), a further link or a further time slot; that is to say two transmission paths (bearers) are required—for example MBC to the LCN2, LCNz and MBC to the LCNy, LCN1 according to FIG. 5—two links or two time slots are required for a single voice link.

Furthermore, three transmission paths (bearers)—for example MBC to the LCNx, LCN0, MBC to the LCNy, LCN1 AND MBC to the LCNz, LCN2 according to FIG. 5—three links or three time slots are required for the case when there are two ISDN-B channel links (voice links).

While the use of the $C_f$ channel appears to be expedient from the viewpoint of channel capacity, the use of the $C_s$ channel is expedient from the point of view of bandwidth economy.

SUMMARY OF THE INVENTION

The task on which the invention is based is to optimize the setting up and use of transmission paths, in terms of the number of transmission paths for wire-free message transmission, in wire-free telecommunications systems, in particular in a DECT-specific RLL/WLL system which is included as a local message transmission loop in an ISDN system.

In general terms the present invention is a method for controlling the setting up and use of transmissions paths between radio transmitting/radio receiving devices in wire-free telecommunications systems, in particular in a DECT-specific RLL/WLL system which is included in an ISDN system as a local message transmission loop. The transmission paths are set up between a first radio transmitting/radio receiving device and a second radio transmitting/radio receiving device in the telecommunications system. The transmission paths are assigned transmission path numbers. System-specific system messages are transmitted on the transmission paths in transmission channels with channel-specific transmission capacities. The radio transmitting/radio receiving devices set up a first transmission path for transmitting the system messages in a first transmission channel with a first channel-specific transmission capacity, such that the first transmission path is assigned a first transmission path number which has not yet been assigned to other transmission paths.

The first transmission path number is reserved for the first transmission path, for transmitting the system messages in the first transmission channel with the first channel-specific transmission capacity.

The reservation of the first transmission path number for the first transmission path for transmitting the system messages in the first transmission channel with the first channel-specific transmission capacity is canceled. A second transmission path number is assigned to and reserved for a second transmission path for transmitting the system messages in the first transmission channel with the first channel-specific transmission capacity if the first transmission path has been set up for transmitting the system messages in a second transmission channel with a second channel-specific transmission capacity.

The first transmission path number which is assigned to the first transmission path, and the second transmission path number, which is assigned to the second transmission path, are the lowest transmission path numbers of the transmission path numbers which can be assigned to the transmission paths and have not yet been assigned to the other transmission paths.

The first transmission path number which is assigned to the first transmission path, and the second transmission path number, which is assigned to the second transmission path, are the highest transmission path numbers of the transmission path numbers which can be assigned to the transmission paths and have not yet been assigned to the other transmission paths.

A third transmission path having an associated transmission path number is set up for transmitting the system messages in a second transmission channel with a second channel-specific transmission capacity. The first transmission path is set up with the first transmission path number or the second transmission path number, by means of which a radio transmitting/radio receiving device of the radio transmitting/radio receiving devices signals to another radio transmitting/radio receiving device to transmit system messages on the first transmission path in the first transmission channel with the first channel-specific transmission capacity.

The telecommunications system is a DECT system.

The telecommunications system is a GSM system.

The telecommunications system is a PHS system, a WACS system or a PACS system.

The telecommunications system is an "IS-54" system or a PDC system.

The telecommunications system is a CDMA system, a TDMA system, an FDMA system or a (with respect to these said transmission standards) hybrid system.

The telecommunications system is a DECT-specific RLL/WLL system which is included as a local message transmission loop in an ISDN system. The first radio transmitting/radio receiving device is a DECT INTERMEDIATE FIXED SYSTEM and the second radio transmitting/radio receiving device is a DECT INTERMEDIATE PORTABLE SYSTEM.

The first transmission channel is the $C_f$ channel of the DECT system.

The second transmission channel is the $C_s$ channel of the DECT system.

The transmission path numbers are the logical connection numbers of the DECT standard.

The idea on which the invention is based is to control the setting up and use of transmission paths (bearers) between radio transmitting/radio receiving devices in wire-free telecommunications systems of the type mentioned and outlined initially by allocating transmission path numbers to the transmission paths, such that collisions while setting up and using the transmission paths (links) are avoided and the resources of the radio interfaces are at the same time used efficiently. In consequence, the complexity of telecommunications systems and the susceptibility to faults when setting up links (setting up the transmission paths) are minimized.

It is advantageous if the transmission path number, which avoids collisions, is reserved for one transmission path for transmitting system messages in a transmission channel with a channel-specific transmission capacity.

It is advantageous for channel changing to be controlled by controlling the transmission path numbers.

It is advantageous for the specified control to make it possible to signal the desire of a radio transmitting/radio receiving device for a channel change to another radio transmitting/radio receiving device.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 6:
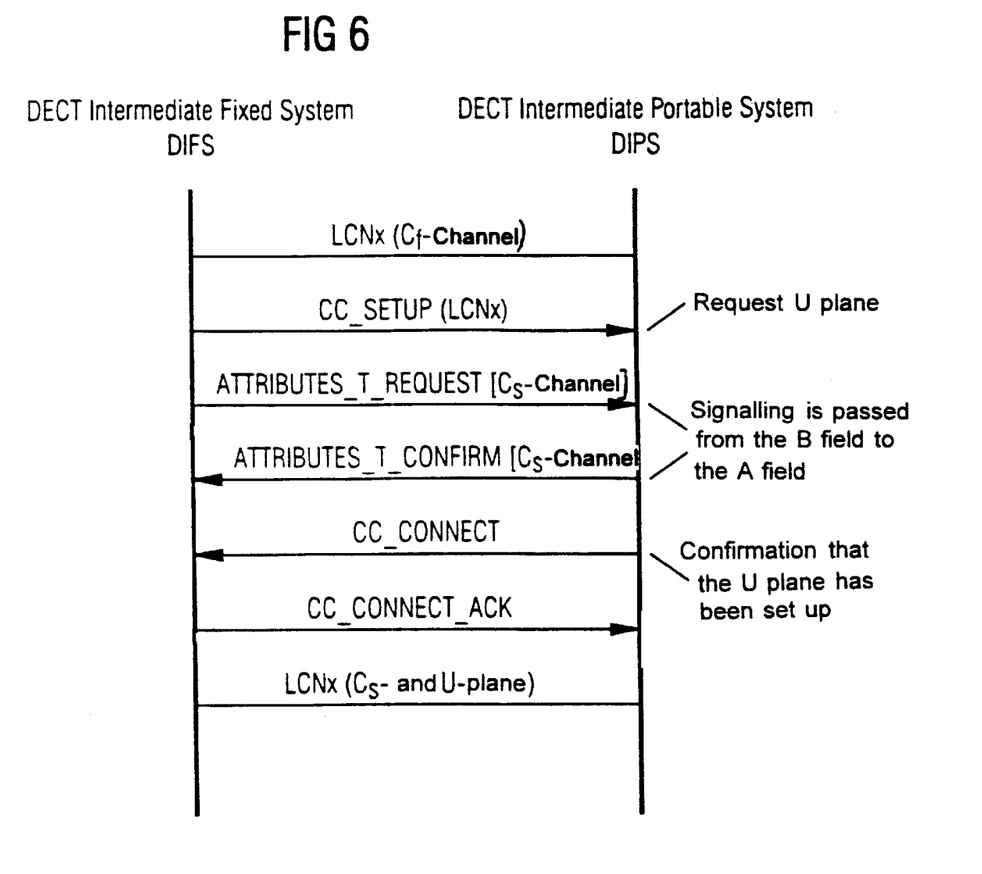
FIG. 6 depicts a stimulus state diagram according to the present invention.

FIG. 6 shows a stimulus state diagram, showing how it is possible by controlling the transmission path numbers to achieve a channel change from the $C_f$ channel to the $C_s$ channel with minimum complexity in terms of transmission paths (saving resources in the radio interface).

The first telecommunications interface DIFS (radio transmitting/radio receiving device) is connected to the second telecommunications interface DIPS (radio transmitting/radio receiving device) on a first transmission path having a first transmission path number LCNx (Logical Connection Number; identifier) by means of the first transmission channel $C_f$. A first NWK message "CC-SETUP" (cf. ETSI publication ETS 300175-5, October 1992, Chapter 6.3.2.1) and the first transmission path number LCNx are now used by the first telecommunications interface DIFS to request the U plane for the second telecommunications interface DIPS.

A first MAC message "ATTRIBUTES_T._REQUEST" and a second MAC message "ATTRIBUTES_T._CONFIRM" (cf. ETSI publication ETS 300175-3, October 1992, Chapter 7.2.5.3.8) are now used for signalling from the DECT B field to the DECT A field. This has the same meaning as changing from the $C_f$ channel to the $C_s$ channel. Subsequently, the telecommunications interfaces DIFS, DIPS use a second NWK message "CC-CONNECT"(cf. ETSI publication ETS 300175-5, October 1992, Chapter 6.3.2.6) and a third NWK message "CC-CONNECT_ACKNOWLEDGE" (cf. ETSI publication ETS 300175-5, October 1992, Chapter 6.3.2.7) interactively to confirm that the U plane and the $C_s$ channel have been set up with the first transmission path number LCNx. Until now, it has been necessary to set up two transmission paths for such a channel change.

Figure 7A:
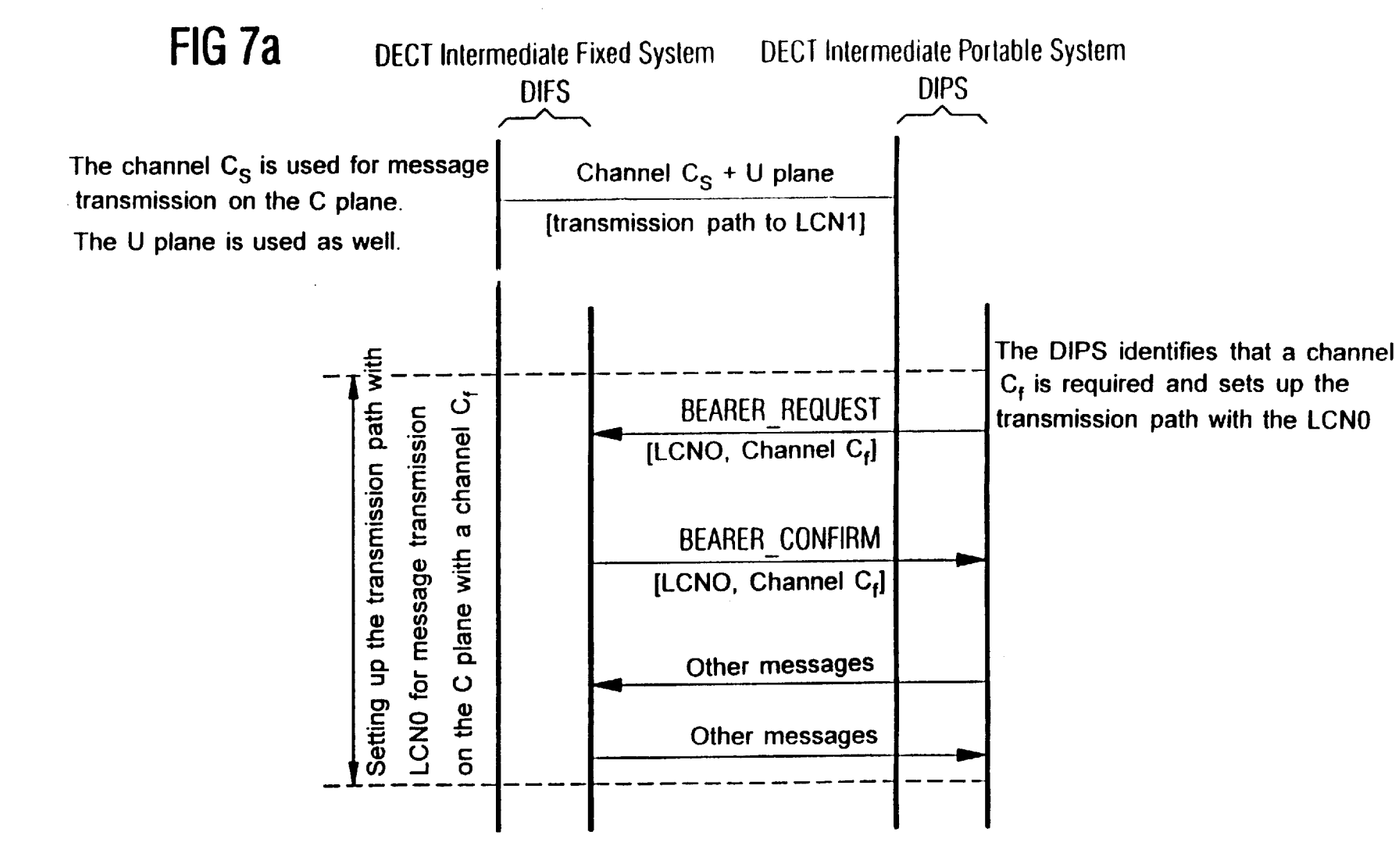
FIGS. 7a and 7b depict a further state diagram according to the present invention.
Figure 7B:
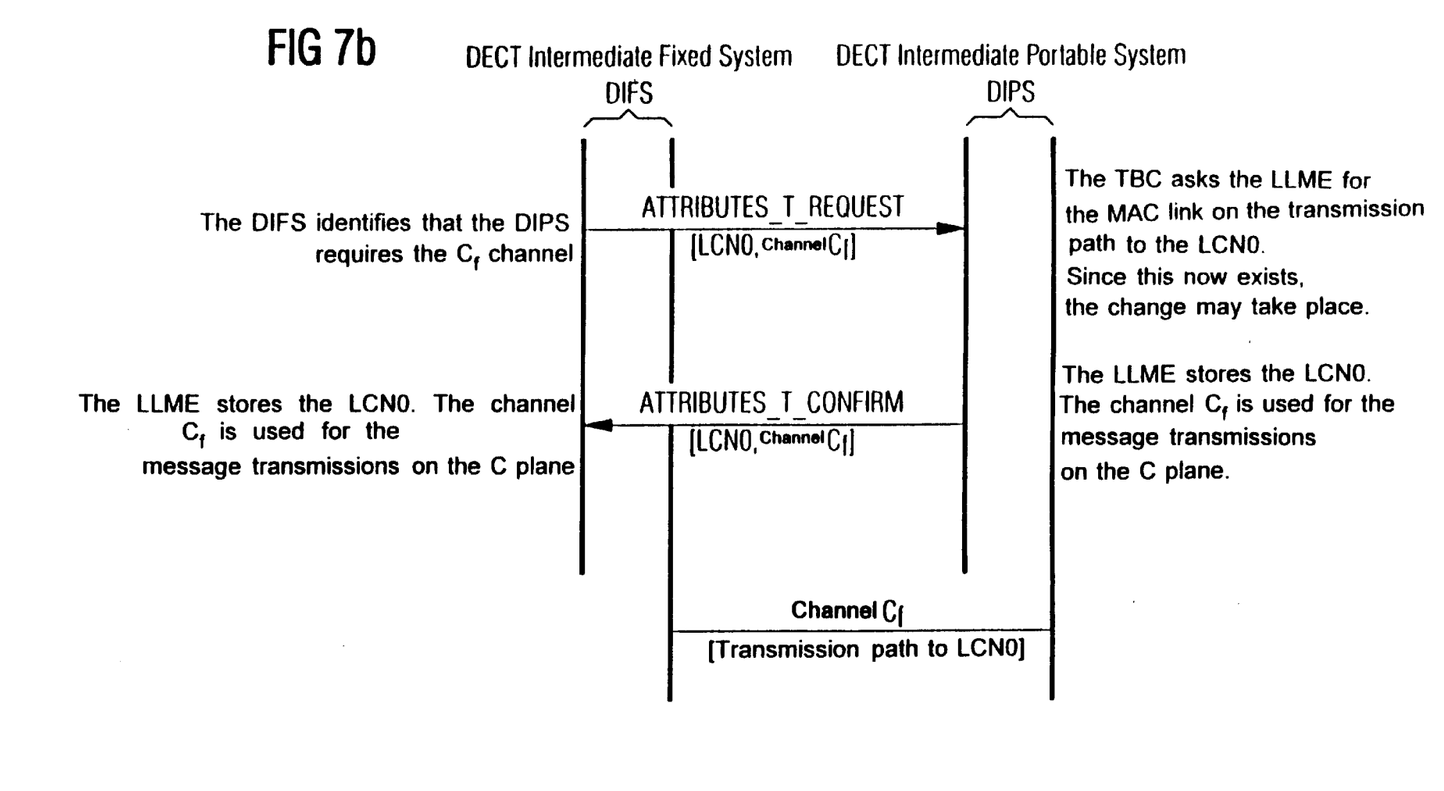

FIGS. 7a and 7b show a further stimulus state diagram, showing how it is possible by controlling the transmission path numbers to signal a channel change, which is desired by the second telecommunications interface DIPS (radio transmitting/radio receiving device) to the first telecommunications interface DIFS (radio transmitting/radio receiving device), and the latter then initiates the channel change and carries it out together with the second telecommunications interface DIPS.

The second transmission channel $C_s$ is used for message transmission on the C plane. The U plane is also used. No transmission path having a transmission path number LCN (identifier) has yet been set up for using the first transmission channel $C_f$. The second transmission channel $C_s$ has a smaller transmission capacity than the first transmission channel $C_f$.

The second telecommunications interface DIPS identifies that the first transmission channel $C_f$ is required. However, since there is still no transmission path having the identifier LCN, for example the identifier LCN0, for the first transmission channel $C_f$, this is set up by it.

The choice of the identifier LCN—in the present case LCN0—as the identifier for the transmission path to be set up is not carried out arbitrarily but, once again deliberately, on the basis of a predetermined selection criterion. Formulated in entirely general form, this criterion consists of using as the identifier LCN the identity of the possible identifiers LCN0, LCN1, LCN2 which have not yet been used for another transmission path, that is to say which is free.

As an alternative to the selection criterion quoted above, it is also possible to use specific features of the selection criterion for identifier allocation. Thus, for example—as in the present case—the lowest free identifier of the identifiers LCN0, LCN1, LCN2 can always be used, or the highest free identifier of the identifiers LCN0, LCN1, LCN2.

In order to set up the transmission path, the second telecommunications interface DIPS, which, in accordance with ETSI publication ETS 300175-3, October 1992, Chapter 10.5.1.2 and 10.5.1.3, is preferably responsible for setting up a transmission path, transmits to the first telecommunications interface DIFS a DECT-specific first B field message "BEARER_REQUEST" (cf. ETSI publication ETS 300175-3, October 1992, Chapter 7.3.3.2) as a COMMAND.

After receiving the first B field message, the first telecommunications interface DIFS then sends a DECT-specific second B field message "BEARER_CONFIRM" (cf. ETSI publication ETS 300175-3, October 1992, Chapter 7.3.3.3) as a RESPONSE to the second telecommunications interface DIPS. The further transmission path is produced in this state, that is to say after the second telecommunications interface DIPS has received the second B field message (cf. ETSI publication ETS 300175-3, October 1992, Chapters 10.5.1.1. to 10.5.1.3).

This is identified by the first telecommunications interface DIFS, so that said interface DIPS transmits the first MAC message "ATTRIBUTES_T._REQUEST" (cf. ETSI publication ETS 300175-3, October 1992, Chapter 7.2.5.3.8) to the second telecommunications interface DIPS.

The second telecommunications interface DIPS confirms the first MAC message "ATTRIBUTES_T._REQUEST" by transmitting the second MAC message "ATTRIBUTES_T._CONFIRM" to the first telecommunications interface DIFS. After this, the first transmission channel $C_f$ is used for message transmission on the C plane.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for controlling setting up and use of transmissions paths between radio transmitting/radio receiving devices in wire-free telecommunications systems, comprising the steps of:
   a) setting up transmission paths between a first radio transmitting/radio receiving device and a second radio transmitting/radio receiving device in a telecommunications system;
   b) assigning the transmission paths transmission path numbers;
   c) transmitting system-specific messages on the transmission paths in transmission channels with channel-specific transmission capacities;
   d) setting up via the radio transmitting/radio receiving devices a first transmission path for transmitting the system messages in a first transmission channel with a first channel-specific transmission capacity, such that the first transmission path is reserved, in a predetermined order, a first transmission path number, as to initiate and realize a change of channel on the first transmission path.

2. The method according to claim 1, wherein a reservation of the first transmission path number for the first transmission path for transmitting the system messages in the first transmission channel with the first channel-specific transmission capacity is canceled, and a second transmission path number is assigned to and reserved for a second transmission path for transmitting the system messages in the first transmission channel with the first channel-specific transmission capacity if the first transmission path has been set up for transmitting the system messages in a second transmission channel with a second channel-specific transmission capacity.

3. The method according to claim 1 wherein, the first transmission path number which is assigned to the first transmission path, and the second transmission path number, which is assigned to the second transmission path, are lowest transmission path numbers of transmission path numbers which can be assigned to the transmission paths and have not yet been assigned to the other transmission paths.

4. The method according to claim 1, wherein the first transmission path number which is assigned to the first transmission path, and a second transmission path number, which is assigned to the second transmission path, are the highest transmission path numbers of the transmission path numbers which can be assigned to the transmission paths and have not yet been assigned to the other transmission paths.

5. The method according to claim 1, wherein a third transmission path having an associated transmission path number is set up for transmitting the system messages in a second transmission channel with a second channel-specific transmission capacity, and wherein the first transmission path is set up with one of the first transmission path number or a second transmission path number, by which a radio transmitting/radio receiving device of the radio transmitting/radio receiving devices signals to another radio transmitting/radio receiving device to transmit system messages on the first transmission path in the first transmission channel with the first channel-specific transmission capacity.

6. The method according to claim 1, wherein the telecommunications system is a DECT system.

7. The method according to claim 1, wherein the telecommunications system is a GSM system.

8. The method according to claim 1, wherein the telecommunications system is a PHS system, a WACS system or a PACS system.

9. The method according to claim 1, wherein the telecommunications system is an "IS-54" system or a PDC system.

10. The method according to claim 1, wherein the telecommunications system is one of a CDMA system, a TDMA system, an FDMA system or a hybrid system of the CDMA system, the TDMA system and FDMA system.

11. The method according to claim 6, wherein is a DECT-specific RLL/WLL system which is included as a local message transmission loop in an ISDN system, and wherein the first radio transmitting/radio receiving device is a DECT INTERMEDIATE FIXED SYSTEM and the second radio transmitting/radio receiving device is a DECT INTERMEDIATE PORTABLE SYSTEM.

12. The method according to claim 6, wherein the first transmission channel is a $C_f$ channel of the DECT system.

13. The method according to claim 3, wherein the second transmission channel is a $C_s$ channel of a DECT system.

14. The method according to claim 6, wherein the transmission path numbers are logical connection numbers of the DECT standard.

15. The method according to claim 1, wherein the wire-free telecommunications systems are DECT specific RLL/WLL system which is included in an ISDN system as a local message transmission loop.

* * * * *